United States Patent
Pankratov (10) Patent No.: US 11,525,464 B2
(45) Date of Patent: Dec. 13, 2022

(54) ROTOR WITH CENTRIFUGALLY WEDGED DAMPER

(71) Applicant: PRATT & WHITNEY CANADA CORP., Longueuil (CA)

(72) Inventor: Maksim Pankratov, Saint-Amable (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/209,303

(22) Filed: Mar. 23, 2021

(65) Prior Publication Data
US 2022/0307521 A1    Sep. 29, 2022

(51) Int. Cl.
| | | |
|---|---|---|
| F04D 29/66 | (2006.01) |
| F02C 7/00 | (2006.01) |
| F01D 5/10 | (2006.01) |
| F01D 25/04 | (2006.01) |
| F16F 15/129 | (2006.01) |

(52) U.S. Cl.
CPC ............ *F04D 29/668* (2013.01); *F01D 5/10* (2013.01); *F01D 25/04* (2013.01); *F02C 7/00* (2013.01); *F16F 15/129* (2013.01); *F05D 2220/32* (2013.01); *F05D 2260/96* (2013.01)

(58) Field of Classification Search
CPC ... F01D 5/10; F01D 5/00; F01D 25/04; F01D 5/02; F01D 25/16; F16F 15/129; F16F 15/1292; F04D 29/668
See application file for complete search history.

(56) References Cited

U.S. PATENT DOCUMENTS

| | | | |
|---|---|---|---|
| 4,108,571 A * | 8/1978 | Mawson | F01D 5/3015 416/221 |
| 4,817,455 A | 4/1989 | Buxe | |
| 4,848,182 A | 7/1989 | Novotny | |
| 5,256,035 A * | 10/1993 | Norris | F01D 5/326 416/220 R |
| 5,373,922 A | 12/1994 | Marra | |
| 5,582,077 A | 12/1996 | Agram | |
| 6,478,544 B2 | 11/2002 | Brandl et al. | |
| 7,217,100 B2 | 5/2007 | Benderradji et al. | |
| 7,458,769 B2 | 12/2008 | Forgue et al. | |
| 8,147,200 B2 * | 4/2012 | Fabre | F01D 5/02 416/185 |
| 8,167,563 B2 | 5/2012 | Kayser | |

(Continued)

*Primary Examiner* — Woody A Lee, Jr.
*Assistant Examiner* — Wesley Le Fisher
(74) *Attorney, Agent, or Firm* — Norton Rose Fulbright Canada LLP.

(57) ABSTRACT

A gas turbine engine rotor having an axis, comprising: a body about the axis having an inner surface, a seat having an outer seat edge at a first radial location surrounded by the inner surface at a second radial location, a lip along the inner surface having an inner lip edge spaced axially away from the seat to define a gap, the lip at a rated axial location between the inner lip edge and the seat facing toward the seat at a normal angle; a damper in the gap having first and second damper surfaces, the first damper surface adjacent the seat; and a split ring in the gap adjacent the second damper surface, having an outer ring edge spaced from the inner surface, engaging the lip at the rated axial location and resiliently expandable against the lip deflects the split ring to load the damper against the seat.

20 Claims, 5 Drawing Sheets

(56) References Cited

U.S. PATENT DOCUMENTS

| | | |
|---|---|---|
| 8,328,519 B2 | 12/2012 | Denis et al. |
| 8,747,054 B2 | 10/2014 | Witlicki |
| 8,979,502 B2 * | 3/2015 | Paquet ................ F01D 5/3015 |
| | | 416/244 A |
| 9,151,170 B2 | 10/2015 | El-Aini et al. |
| 10,196,896 B2 * | 2/2019 | Bryant ..................... F01D 5/10 |
| 10,385,696 B2 * | 8/2019 | Edwards ................. F01D 5/30 |
| 10,436,032 B2 * | 10/2019 | Pankratov ................ F02C 3/04 |
| 10,502,061 B2 * | 12/2019 | Pankratov ................ F01D 5/10 |
| 10,724,375 B2 * | 7/2020 | Prescott ................. F16F 15/14 |
| 2013/0004313 A1 | 1/2013 | El-Aini |
| 2014/0314578 A1 | 10/2014 | Xu |
| 2017/0321556 A1 * | 11/2017 | Pankratov ................ F01D 5/10 |
| 2020/0392849 A1 | 12/2020 | Di Paola et al. |

* cited by examiner

ROTOR WITH CENTRIFUGALLY WEDGED DAMPER

TECHNICAL FIELD

The application relates generally to gas turbine engine rotors and, more particularly, to friction damping arrangements for damping gas turbine engine rotor vibration.

BACKGROUND OF THE ART

Gas turbine engines have rotors (e.g., turbine or compressor rotating parts such as discs, seal runners, etc.) which are in some cases provided with mechanical damping to mitigate high vibratory stress adverse to field life of the rotor and in some cases of other components of the engine mechanically connected thereto. Conventionally, damping is provided by a ring damper, typically in the form of a wire, fitted to a corresponding groove defined in the rotor. In use, such dampers tend to stick to the rotor by friction, causing the damper to deform together with the rotor as one solid body. Under such circumstances, relative sliding, or kinetic friction, of the damper relative to the rotor is hindered and, as a result, so is the vibration damping potency of the damper. In absence of sufficient kinetic friction of the damper relative to the rotor, energy dissipation otherwise occurring at the interface between the damper and the rotor instead contributes to vibratory stress in the rotor.

SUMMARY

In accordance with an aspect of the present technology, there is provided a gas turbine engine rotor having a rotation axis, the gas turbine engine rotor comprising: a body rotatable about the rotation axis, the body having an inner body surface radially inward relative to the rotation axis, a seat axially inward the body relative to the rotation axis, the seat having an outer seat edge at a first radial location of the body relative to the rotation axis, the outer seat edge surrounded by the inner body surface at a second radial location of the body, the body including a lip extending circumferentially along the inner body surface, the lip having an inner lip edge spaced axially away from the seat so as to define an axial gap between the seat and the lip, the lip at a rated axial location of the body between the inner lip edge and the seat facing toward the seat at a normal angle relative to the rotation axis; a damper disposed about the rotation axis in the axial gap, the damper having axially opposite first and second damper surfaces, the first damper surface adjacent to the seat; and a split ring disposed about the rotation axis in the axial gap adjacent to the second damper surface, the split ring having an outer ring edge radially outward relative to the rotation axis and spaced radially inwardly from the inner body surface, the split ring radially engaging the lip at the rated axial location and resiliently expandable radially outwardly under centrifugal load relative to the rotation axis such that expanding the split ring radially against the lip axially deflects the split ring toward the seat so as to axially load the damper against the seat.

In accordance with another aspect of the present technology, there is provided a gas turbine engine rotor defining a rotation axis, the rotor comprising: a body rotatable about the rotation axis, the body having an inner body surface radially inward relative to the rotation axis, a seat axially inward the body relative to the rotation axis, the seat having an outer seat edge at a first radial location of the body relative to the rotation axis, the outer seat edge surrounded by the inner body surface at a second radial location of the body relative to the rotation axis, the body having a conical ramping surface about the rotation axis tapering radially inwardly from an outer ramp edge of the conical ramping surface to an inner ramp edge of the conical ramping surface located radially inward of the first radial location, the inner ramp edge spaced axially away from the seat so as to define an axial gap between the seat and the conical ramping surface; a damper disposed about the rotation axis in the axial gap, the damper having axially opposite first and second damper surfaces, the first damper surface adjacent to the seat; and a split ring disposed about the rotation axis in the axial gap adjacent to the second damper surface, the split ring radially engaging the conical ramping surface radially inward of the outer ramp edge, the split ring resiliently expandable radially outwardly under centrifugal load relative to the rotation axis such that radially loading the split ring against the conical ramping surface axially loads the split ring against the damper toward the seat.

DESCRIPTION OF THE DRAWINGS

Reference is now made to the accompanying figures in which.

DETAILED DESCRIPTION

Figure 1:
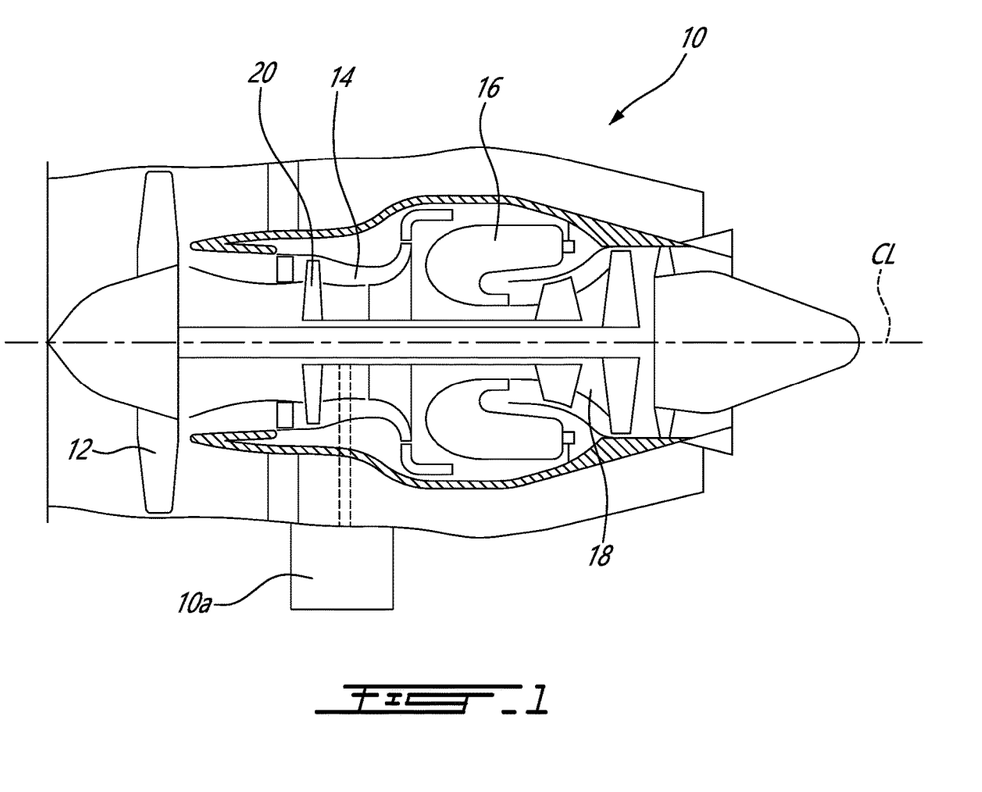
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A rotor 20 having a damping means is shown among rotary parts of the engine 10 rotatably disposed about an axis CL. Other rotary parts of the engine 10 are also provided for example in an accessory gearbox 10a of the engine 10. Although embodiments of the rotor 20 described herein relate to a compressor disc of the compressor section 14, the rotor 20 can take various other forms. For instance, depending on the embodiment, features of the rotor 20 defining the damping means can belong to the fan 12 or to the turbine section 18 (for instance a turbine disc or a turbine cover), to a seal runner or to any other rotary part of the engine 10 for which vibration damping is desirable. Some such rotary parts are rotatable about an axis remote from the axis CL, for example parts located in the accessory gearbox 10a.

Figure 2:
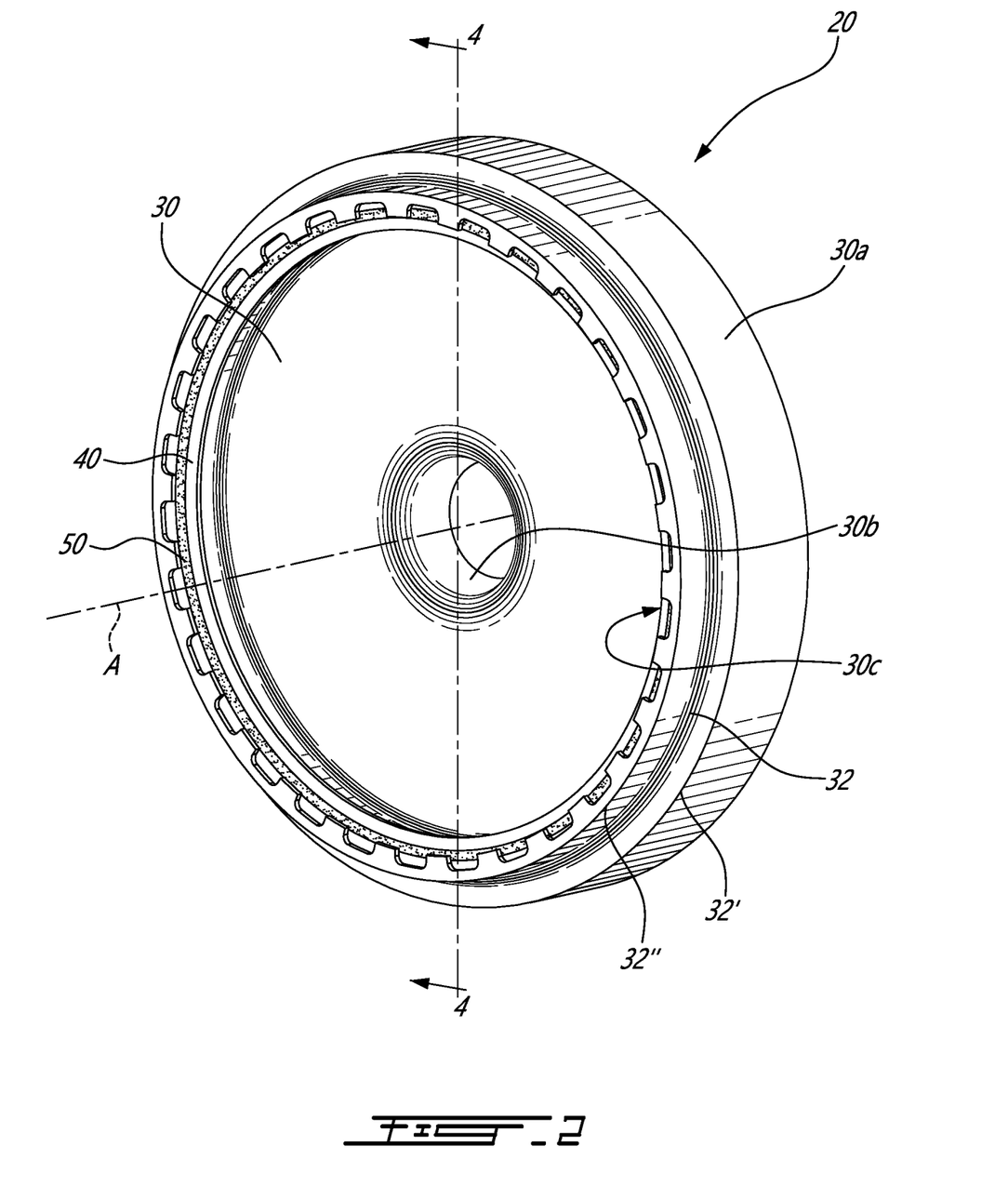
FIG. 2 is an isometric view of an embodiment of the rotor of the gas turbine engine of FIG. 1.
Figure 3:
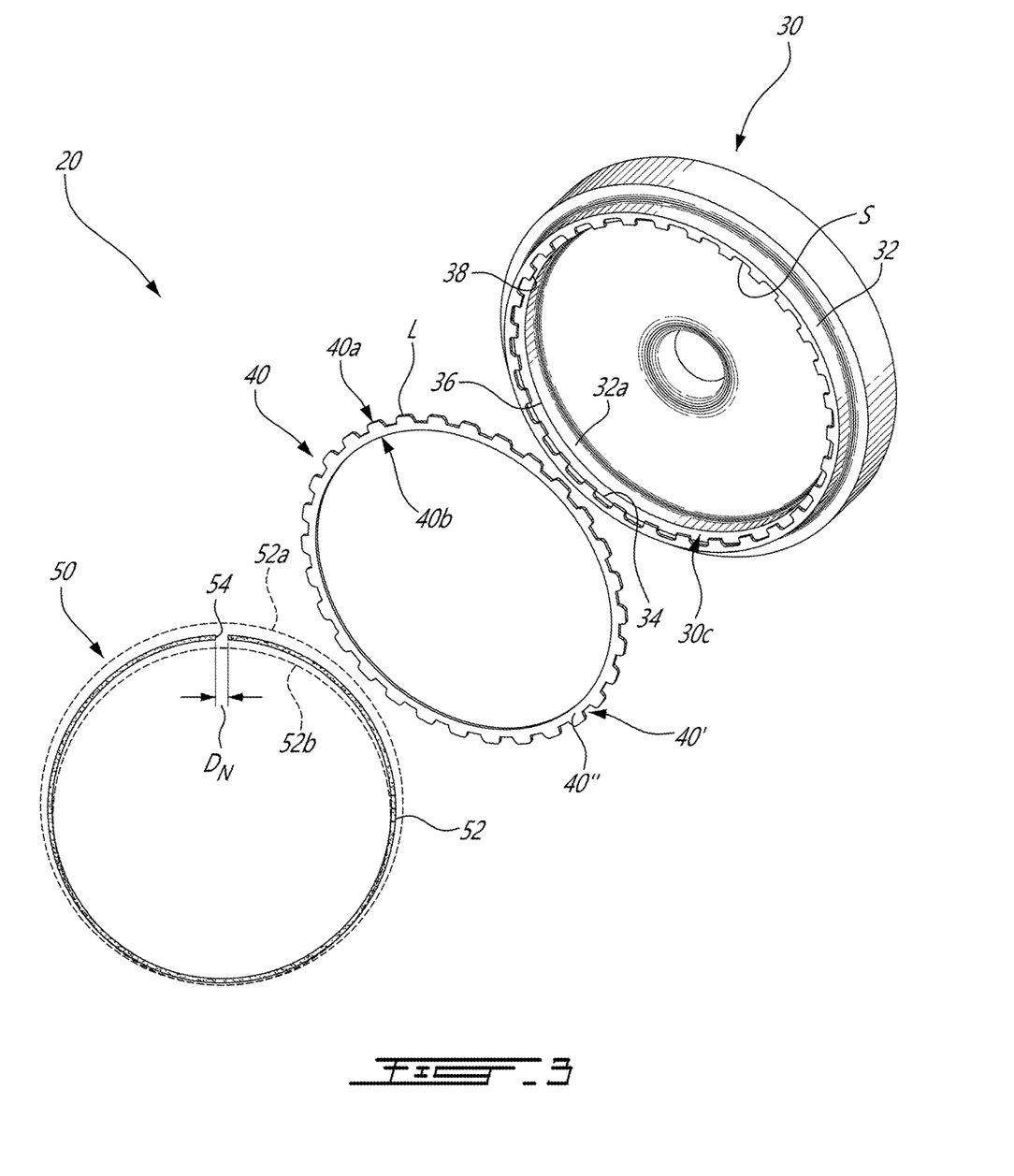
FIG. 3 is an exploded view of a disc, an annular damper and a split ring of the rotor of FIG. 2.

Referring to FIGS. 2 and 3, the rotor 20 will now be generally described. The rotor 20 includes a rotatable body referred to as a disc 30, an annular damper 40 and a resiliently expandable ring 50 disposed about a rotation axis A. Relative to the axis A, a side of the disc 30 extends radially inwardly from a radially outer disc surface 30a defining an outermost disc diameter to a radially inner disc surface 30b defining an innermost disc diameter surrounding a bore. The disc 30 has a circumferentially extending recess 30c located radially inward of the outermost disc diameter and axially into the side of the disc 30. The recess 30c extends radially outwardly to a radial location proximate to the outer disc surface 30a. The side of the disc 30 having the recess 30c has an annular ridge 32 projecting axially outwardly from a first ridge end 32' to a second ridge end 32". The recess 30c extends into the ridge 32 from the second ridge end 32", stopping short of the first ridge end 32'. The damper 40 and the ring 50 are disposed about the axis A next to one another inside the recess 30c. The damper 40 axially abuts the disc 30 and is held in position by the ring 50 and the disc 30. It should be understood that the depicted implementation of the disc 30 is merely exemplary, and that the recess 30c may be arranged differently depending on the implementation. For example, in some implementations, the radial location circumscribing the recess 30c is closer to the innermost disc diameter than to the outermost disc diameter. In some implementations, the recess 30c is an annular groove.

Turning now to FIG. 3, the damper 40 and the ring 50 are shown isolated from the disc 30. An inner body surface 34 of the disc 30 defines a radially outer boundary of the recess 30c. At a first axial location along the inner body surface 34, a first radially extending surface of the disc 30 defines an outwardly facing axial boundary of the recess 30c referred to as a seat 36. At a second axial location spaced axially outward of the first axial location, a second radially extending surface of the disc 30 defines an inwardly facing axial boundary of the recess 30c referred to as a lip 38.

The damper 40 is an annular body extending from a first damper surface 40' complementary to the seat 36 to a second damper surface 40" complementary to the ring 50. The damper 40 extends radially between an outer damper surface 40a having an outer damper diameter and an inner damper surface 40b having an inner damper diameter. The damper 40 is constructed so as to withstand centrifugal loads associated with typical rotation speeds about the axis A. Any radial expansion of the damper 40 occurring under normal use due to centrifugal loading and heating imparted to the damper 40 is pre-determined. As such, the recess 30c is sized to define a radial gap surrounding the outer damper surface 40a and having dimensions that are suitable for the damper 40 to remain radially free with respect to the disc 30 regardless of operating conditions of the engine 10. On the other hand, the ring 50 is constructed so as to be resiliently expandable in a radially outward direction relative to the axis A under the typical rotation speeds. As such, an outer ring edge 52 circumscribing the ring 50 and defining an outer ring diameter will expand from a nominal diameter to a maximum diameter 52a upon the ring 50 freely rotating about the axis A at high rotation speeds within a range of typical speeds. As previously mentioned, the ring 50 is characterised as being "split" in reference to a disconnect along its circumference, defining mutually opposing ends 54. In the depicted implementation, the ends 54 are spaced apart by a circumferential distance DN upon the ring 50 being at the nominal diameter absent any external load. The ring 50 is resiliently compressible radially inwardly such that the ends 54 are brought toward one another until the ring 50 is circumscribed by a minimum diameter 52b smaller than the nominal diameter. The ring 50 has a wire-like construction with a round radial cross section, although other shapes are contemplated.

Figure 5:
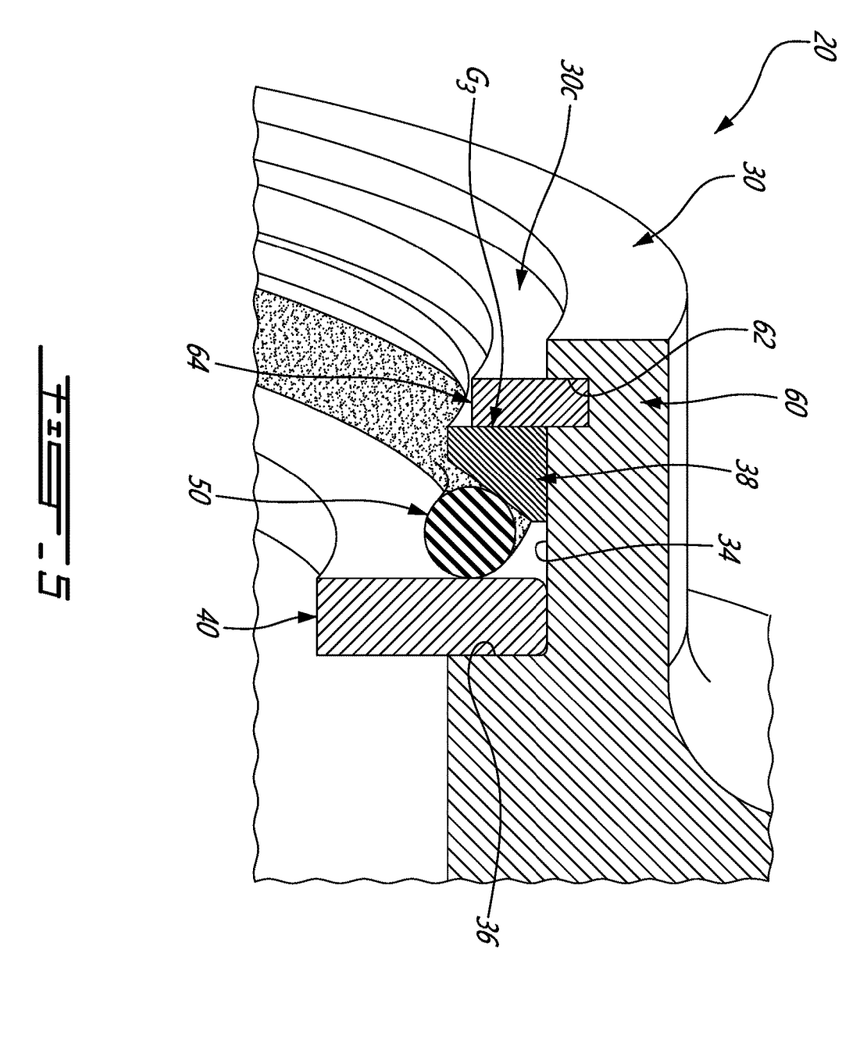
FIG. 5 is an enlarged cross-section view of yet another embodiment of the gas turbine engine rotor having a disc provided with a detachable lip.

The lip 38 is configured to be selectively traversable by the damper 40 for the damper 40 to be inserted into the recess 30 all the way to the seat 36. In this embodiment, a radially inner contour of the lip 38 defines circumferentially spaced apart axial passages, or slots S, extending across the lip 38. A radially outer contour of the damper 40 is shaped complementarily to the lip 38, defining circumferentially spaced apart projections, or lugs L respectively receivable by a corresponding slot S of the lip 38. The depicted contours of the lip 38 and the damper 40 are merely one of numerous possibilities. With the damper 40 placed in the recess 30c adjacent to the seat 36, the ring 50 can be fitted in the recess 30c between the lip 38 and the damper 40 to block the slots S of the lip 38, separating portions of the lip 38 circumferentially spaced between the slots S from the lugs L of the damper 40. In alternate configurations (such as shown in FIG. 5 and described below), the lip 38 is an annular component that is detachable from a remainder of the disc 30 to allow unhindered placement of the damper 40 onto the seat 36, and fastenable into place to prevent removal of the damper 40 from the recess 30c.

Figure 4A:
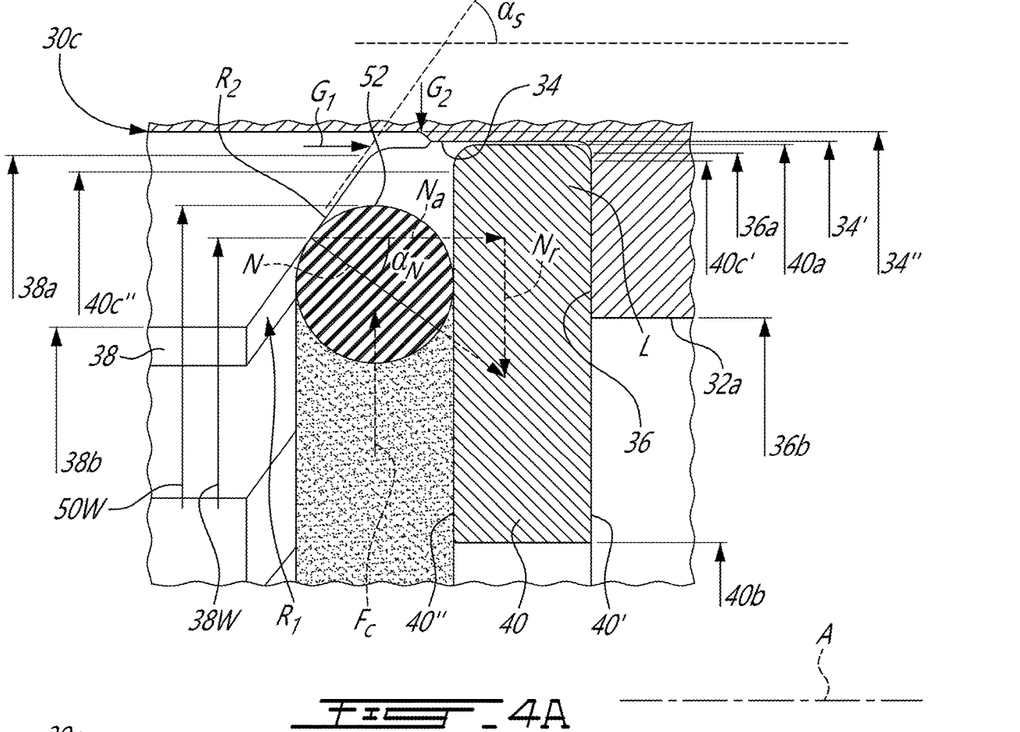
FIG. 4A is an enlarged cross-section view taken along line 4-4 of FIG. 2, showing the annular damper and the split ring fitted between a seat and a lip of the disc.

With reference to FIG. 4A, structural and functional relationships between the disc 30, the damper 40 and the ring 50 will now be described further. In the recess 30c, an axial gap G1 is defined between the seat 36 and the lip 38. The inner body surface 34 circumscribes the axial gap G1 as it extends away from the seat 36 to the lip 38. The damper 40 and the inner disc surface 34 are sized and arranged such that the damper 40 is freely slidable axially across the axial gap G1 while the damper 40 remains radially loose with respect to the inner disc surface 34. It should be noted that the damper 40 and the ring 50 are sized so as to as to fit next to one another across the axial gap G1. In this position, the damper 40 extends from the seat 36, and the ring 50 extends from the damper 40 to the lip 38. The damper 40 is radially loose relative to the disc 30 and to the ring 50, whereas the ring 50 is radially engaged with the disc 30 so as to form a wedge between the lip 38 and the damper 40. The wedge may be formed by a suitably shaped surface of either one or both of the lip 38 and the ring 50. One such surface may be a circumferential surface of the lip 38, referred to as a ramping surface R1 of the lip 38, extending alongside the axial gap G1. Stated otherwise, the ring 50 and the ramping surface R1 of the lip 38 are in a wedged configuration in which the ramping surface R1 is cooperable with the ring 50 to axially load the damper 40 against the seat 36 via the ring 50 as the ring 50 is radially loaded against the ramping surface R1. In the wedged configuration, the outer ring edge 52 of the ring 50 is circumscribed by a rated ring diameter 50W smaller than the maximum ring diameter 52a. A first side of the ring 50 has a first ring edge in contact with the damper 40, and a second side of the ring 50 opposite the first side has a second ring edge in contact with the ramping surface R1. By cooperating with the ramping surface R1, the ring 50 remains resiliently expandable radially outwardly, bringing the outer ring edge 52 closer to the outer lip edge, and thus in this embodiment closer to the inner body surface 34.

The seat 36 is a flat, annular surface located inward a side of the disc 30. The seat 36 extends radially inwardly relative to the axis A from an outer seat edge 36a defining an outer seat diameter, to an inner seat edge 36b defining an inner seat diameter (in this case corresponding to an edge of the inner ridge surface 32a axially spaced from the first ridge end 32'). The location of the outer seat edge 36a may be referred to as a first radial location of the disc 30. A portion of the inner body surface 34 proximate to the seat 36 surrounds the seat 36 at a second radial location of the body radially outward of the first radial location. The lip 38 extends circumferentially along the inner body surface 34, and extends radially inwardly relative to the axis A from an outer lip edge 38*a* defining an outer lip diameter, to an inner lip edge 38*b* defining an inner lip diameter. It shall be noted that in this embodiment, the lip 38 is located radially inward of the inner body surface 34, and a portion of the inner body surface 34 proximate to the lip 38 surrounds the outer lip edge 38*a* so as to define a radial clearance radially outward of the ramping surface R1. Also, the inner lip diameter is smaller than the outer seat diameter. Hence, the inner lip edge 38*b* is located radially inward of the first radial location of the body and thus of the outer seat edge 36*a*. The inner lip edge 38*b* is spaced axially away from the seat 36, such that the seat 36 and the lip 38 can be said to radially overlap one another to define opposite ends of the axial gap G1. Other arrangements of the lip 38 are possible. For example, the inner lip edge 38*b* may instead be located radially outward of the first radial location, and the outer lip edge 38*a* may be located radially outward of the second radial location. The lip 38 is in this case defined by a portion of the ridge 32 having the second ridge end 32". On a side of the lip 38 closest to the seat 36 (here being the side of the lip 38 opposite to the second ridge end 32"), the lip 38 is shaped complementarily to the split ring 50 so as to axially deflect the split ring 50 toward the seat 36 upon the split ring 50 extending radially outwardly so as to load the lip 38 at a rated axial location on the lip 38 defining a rated lip diameter 38W. The rated lip diameter 38W is defined by the ramping surface R1 of the lip 38. The ramping surface R1 extends away from the seat 36 from a first axial location to a second axial location of the disc 30, with the rated axial location therebetween. In this embodiment, the ramping surface R1 is circumferentially segmented due to the presence of the slots S across the lip 38. At the rated lip diameter 38W, the ramping surface R1 extends toward the inner body surface 34 at a slope angle αS relative to the axis A. The slope angle αS can be described as complementary to a normal angle αN of a normal direction of the ramping surface R1 at the rated lip diameter 38W relative to the axis A. The ramping surface R1 has at least one of a curved portion being convex relative to the axis A and a tapered (or conical) portion tapering toward the axis A away from the seat 36 which, at the rated axial location, faces toward the seat at the normal angle αN. In this embodiment, the lip 38 has an exemplary tapered shape tapering from an outer ramp edge being the outer lip edge 38*a* to an inner ramp edge being the inner lip edge 38*b*. The ramping surface R1 is shaped such that the rated axial location defining the rated lip diameter 38W is spaced inbetween the outer and inner ramp edges. In other implementations, the rated axial location can otherwise correspond to the inner lip edge 38*b*. The outer ramp edge can otherwise be located radially inward of the outer lip edge 38*a*, such that a radial clearance is defined between the outer ramp edge and the outer lip edge 38*a*.

The outer damper diameter circumscribing the damper 40 is smaller than a first inner body diameter 34' of the inner body surface 34 radially outward of the seat 36. The inner damper diameter is in this case smaller than the inner seat diameter of the seat 36. In the depicted exemplary implementation of the damper 40, a radial cross section of the damper 40 is generally rectangular in shape. Radially outer edges on either side of the damper 40 respectively circumscribe the first damper surface 40' and the second damper surface 40" at a first damper diameter 40*c*' and a second damper diameter 40*c*" smaller than the outer damper diameter. The first damper diameter 40*c*' is smaller than the outer seat diameter, providing radial clearance therebetween. Other shapes of the damper 40 are possible, provided that a suitable cooperation with the disc 30 and with the ring 50 is possible to allow a suitable loading of the damper 40 against the disc 30 while the damper 40 remains radially free relative to the disc 30 and to the ring 50. For example, an outer surface of the damper 40 extending between the first and second damper surfaces 40', 40" and defining the outer damper diameter 40*a* may be flat, or define radially outer edges that are beveled or curved more or less than those depicted in FIG. 4A.

Figure 4B:
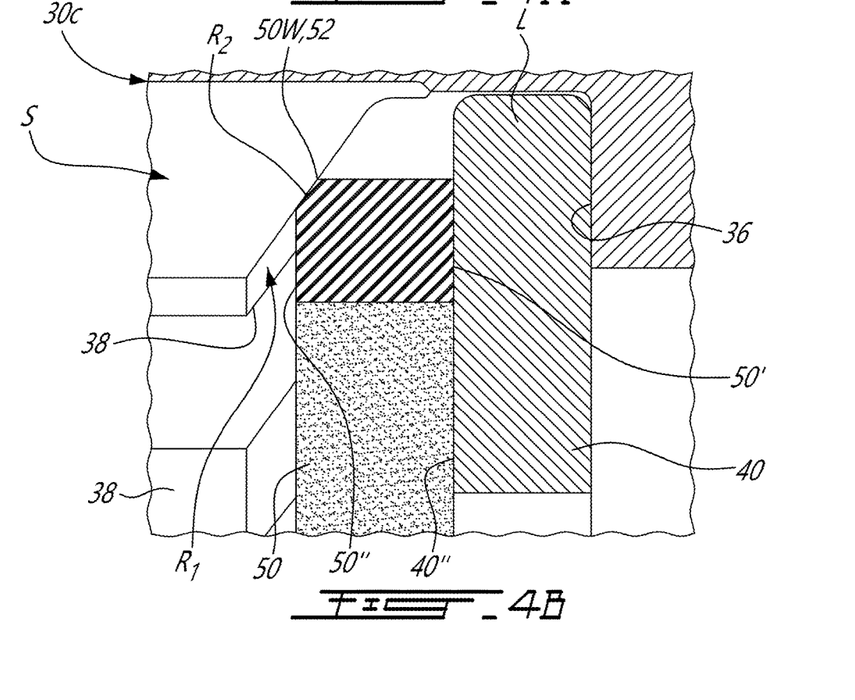
FIG. 4B is an enlarged cross-section view of another embodiment of the gas turbine engine rotor including a split ring having a tapered surface.

The above mentioned suitable loading of the damper 40 refers to an axial load to be exerted by the first damper surface 40' against the seat 36 having a magnitude greater than a minimum threshold from which friction between the first damper surface 40' and the seat 36 is sufficient for friction damping to occur, and yet lower than a maximum threshold from which locking of the damper 40 is deemed possible. The suitable cooperation refers to structural characteristics of the disc 30, the damper 40 and the ring 50 rendering the ring 50 capable of being expandable radially outwardly against the lip 38 outward of the rated lip diameter 38W so as to deflect axially away from the lip 38 and toward the seat 36 to exert the axial load onto the damper 40. With the ring 50 in the wedged configuration absent any centrifugal load, the ring 50 is circumscribed by the outer ring edge 52 at a rated ring diameter 50W and is in contact with the lip 38 at the rated axial location defining the rated lip diameter 38W. A first ring edge of the ring 50 axially inward of the outer ring edge 52 contacts the damper 40 so as to be radially free relative to the damper 40, whereas a second ring edge of the ring 50 axially outward of the outer ring edge 52 contacting the lip 38 at the rated axial location defines a ramping surface R2 of the ring 50. Under centrifugal load, the ring 50 deflects toward the seat 36 against the damper 40 as the ramping surface R2 of the ring 50 follows the ramping surface R1 of the lip 38. In the depicted exemplary implementation of the split ring 50, the rated ring diameter 50W is greater than the rated lip diameter 38W, and the outer ring edge 52 is radially free relative to the lip 38 and to the inner body surface 34. Alternate implementations are possible, for example as shown in FIG. 4B.

It shall be noted that the inner body surface 34, the damper 40 and the ring 50 are sized and arranged such that a radial gap G2 is defined from around the damper 40 at the seat 36 to around the ring 50 at the rated axial position where the lip 38 has the rated lip diameter 38W. The inner body surface 34 circumscribes a first portion of the radial gap G2 as it extends away from the seat 36 from around the first damper surface 40' to around the second damper surface 40" of the damper 40, and a second portion of the radial gap G2 as it extends toward the lip 38 from around the second damper surface 40" to around the ring 50. A remainder of the radial gap G2 is circumscribed by the lip 38 as the lip 38 extends from the rated axial location toward a junction of the lip 38 with the inner body surface 34. The ramping surface R1 of the lip 38 circumscribes the radial gap G2 surrounding the ring 50 as the ramping surface R1 extends from the rated axial location, where the ramping surface R1 circumferentially contacts the second ring edge of the ring 50, to the outer ramp edge, where the ramping surface R1 is radially outward of the outer ring edge 52. In the depicted exemplary implementation of the rotor 20, the inner body surface 34 defines a first sloped portion extending from the outer seat diameter to a circumferential edge having the first inner body diameter 34' spaced axially from the seat 36. From the edge of the first sloped portion having the first inner body diameter 34', the inner body surface 34 extends toward the lip 38, and defines a second sloped portion extending to a second inner body diameter 34" greater than the first inner body diameter 34' at the junction with the lip 38. The second sloped portion of the inner body surface 34 can also be described as a portion of the lip 38 and, in this case, as a curved portion of the ramping surface R1 leading to the outer lip edge 38a. In other embodiments, at least one of the first and the second sloped portions is omitted, such that the inner body surface 34 joins either the seat 36 or the lip 38 at an edge having the first inner body diameter 34'. The sloped portions are curved surfaces, although beveled surfaces are contemplated.

Whereas the damper 40 is axially engaged with the seat 36 and with the ring 50, the damper 40 remains free to expand radially relative to the inner body surface 34 and to the ring 50. Stated otherwise, the outer damper surface defining the outer damper diameter 40a is radially displaceable in the radial gap G2 between a nominal radial position and a rated radial position outward of the nominal position yet inward of the inner body surface 34. Such radial displacement of the damper 40 takes into account deformation of the damper 40 due to compression loading, centrifugal loading and/or heating, and radial vibration amplitude of the damper 40, if any. In use, at any given radial position, the damper 40 tends to be absent any circumferential vibration, and exhibit little or no circumferential strain. On the other hand, as the disc 30 vibrates, vibratory strain and stress occur in the disc 30, including in the circumferential direction. As a result, slippage occurs between the seat 36 and the damper 40 in the circumferential direction, allowing friction to occur between the first damper surface 40' of the damper 40 and the seat 36 upon the damper 40 being axially loaded against the seat 36, thus providing frictional damping of the disc 30. Principles of frictional damping as applied to gas turbine engine rotary parts are described in U.S. Pat. No. 10,502,061, the contents of which are hereby incorporated by reference.

In the wedged configuration, radially expanding the ring 50 to outward of the rated ring diameter 50W deflects the ring 50 along the lip 38 and toward the damper 40. Upon the rotor 20 rotating about the axis such that the ring 50 bears a centrifugal force Fc, the ring 50 is loaded against the lip 38 such that a reaction force normal to the lip 38, a normal force N, is exerted against the ring 50. At the rated lip diameter 38W, the normal force N is oriented at the normal angle αN relative to the axis A. As such, the normal force N can be represented as a radial component (or radial reaction force) Nr and in an axial force component (or axial reaction force) Na. Under the axial reaction force Na, the ring 50 exerts an axial force Fa of a corresponding magnitude onto the damper 40 and, ultimately, onto the seat 36.

Hence, the lip 38, the ring 50 and the damper 40 can be said to be cooperable to convert the centrifugal force Fc exerted by the ring 50 against the lip 38 to the axial force Fa exerted by the damper 40 against the seat 36. The magnitude of the axial force Fa is a function of a plurality of parameters of the rotor 20, one or more of which can be set to a desired value so as to obtain a desired magnitude of the axial force Fa. For example, the centrifugal force Fc can be obtained based on the following equation:

$$F_c = mr\omega^2$$

where m corresponds to a mass of the ring 50, r corresponds to a radius of curvature defined by the ring 50 relative to the axis A, and ω corresponds to a rotation speed of the rotor 20 (and hence of the ring 50) about the axis A. Therefore, in view of a range of rotation speeds of the rotor for a given implementation, any one or more of the parameters including the normal angle αN (and the slope angle αS complementary thereto), the mass m and the radius of curvature r of the ring 50 can be set to produce a desired range of axial force values, or magnitudes, for the axial force Fa. The desired range of axial force values can include a given value sufficient for producing a desired level of friction damping for a given rotation speed of the range of rotation speeds. The desired range of axial force values can also be determined so as to be lower than an axial force value at which the resulting friction between the damper 40 and the seat 36 is susceptible to lock, or bind, the damper 40. The given rotation speed can for example be a speed threshold over which the centrifugal force Fc causes the ring 50 to stick to the lip 38 and thus to deform with the lip 38 as if the ring 50 and the lip 38 were an integral body.

Other parameters having an effect on the level of friction damping achievable at a given rotation speed include a size of a first frictional interface (or first frictional engagement area) defined by the seat 36 and the first damper surface 40', a first friction coefficient of the first frictional interface, a size of a second frictional interface (or second frictional engagement area) defined by the second damper surface 40" and the ring 50, a second friction coefficient of the second frictional interface, a size of a third frictional interface (or third frictional engagement area) defined by the ramping surface R2 of the ring 50 and the ramping surface R1 of the lip 38, a third friction coefficient of the third frictional interface, and circumferential rigidity (i.e., a capacity to resist strain in the circumferential direction) of the damper 40. Such parameters can be set so that circumferential strain of the damper 40 resulting from vibratory loads is minimized compared to a circumferential strain of the disc 30, resulting in a first circumferential strain difference, or circumferential slippage, occurring at the first frictional interface. Conversely, a second circumferential slippage can result at the second frictional interface, at least under certain conditions. Such slippage will, due to the friction in play, produce damping work or, stated otherwise, dissipate vibration energy. As slippage must also occur at the third frictional interface for the ring 50 to slip relative to the lip 38 and toward the damper 40, the ramping surface R1 of the lip 38 and the ring 50 are shaped with respect to one another such that the ring 50 will not stick to the lip 38 at rotation speeds lower than the speed threshold. For instance, the ramping surface R1 can be set such that a tangent of the slope angle αS is equal to or greater than the third friction coefficient.

In FIG. 4B, there is shown another embodiment of the rotor 20, in which the radial cross section of the ring 50 is non-circular. The ring 50 is shown in the wedged configuration, with the outer ring edge 52 circumscribed by the rated ring diameter 50W which, in this case, corresponds to the outer ring diameter and to the rated lip diameter 38W. On either side, the ring 50 is provided with first and second ring surfaces 50', 50", with the first ring surface 50', defining the first ring edge, laid flat against the second surface 40" of the damper 40. It should be noted that the ramping surface R2 of the ring 50 is complementary to the ramping surface R1 of the lip 38. In this exemplary implementation, the ramping surface R2 is tapered, or conical, and the ramping surfaces R1, R2 taper at a same angle. In other implementations, the ramping surfaces R1, R2 may taper at angles being different yet suitable for the ring 50 to be cooperable with the lip 38.

It is also contemplated that in certain implementations, the ramping surface R1 of the lip 38 may be curved. The ramping surface R2 of the ring 50 in this case extends from the outer ring edge 52 to the second ring surface 50". The outer ring edge 52 is thus part of the ramping surface R2 and engages the lip 38 at the rated axial location. The second ring edge is in this case defined at a junction between the ramping surface R2 and the second ring surface 50". It is contemplated that in alternate implementations, the ramping surface R2 may be radially inward of the outer ring edge 52.

With reference to FIG. 5, yet another embodiment of the rotor 20 will be described. The lip 38 is an annular, discrete component that is sized to fit the recess 30c radially inward of the inner body surface 34. The disc 30 is also provided with a fastening means 60 suitable for maintaining an adequate position of the lip 38 relative to the seat 36, at least upon the ring 50 and the damper 40 being present in the recess 30c. The fastening means 60 includes a radial groove 62 defined in the inner body surface 34, and an annular fastener 64 fitted to the groove 62. The annular fastener 64 is sized so as to extend radially inwardly from inside the groove 62 to radially inward of the inner body surface 34. The lip 38, the ring 50 and the damper 40 are fitted to an axial gap G3 defined between the annular fastener 64 and the seat 36. The annular fastener 64 is a retaining ring having a single-turn, circular contour and a rectangular radial cross section, although other types and shapes of fasteners are contemplated. For example, spiral rings, C-shaped rings and rings having outwardly projecting lugs may be implemented.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, friction damping features consistent with the above can be implemented on rotors of various types and shapes, and at one or more locations along their radial and axial spans. Yet further modifications could be implemented by a person of ordinary skill in the art in view of the present disclosure, which modifications would be within the scope of the present technology.

The invention claimed is:

1. A gas turbine engine rotor having a rotation axis, the gas turbine engine rotor comprising:
   a body rotatable about the rotation axis, the body having an inner body surface radially inward relative to the rotation axis, a seat axially inward the body relative to the rotation axis, the seat having an outer seat edge at a first radial location of the body relative to the rotation axis, the outer seat edge surrounded by the inner body surface at a second radial location of the body, the body including a lip extending circumferentially along the inner body surface, the lip having an inner lip edge spaced axially away from the seat so as to define an axial gap between the seat and the lip, the lip at a rated axial location of the body between the inner lip edge and the seat facing toward the seat at a normal angle relative to the rotation axis;
   a damper disposed about the rotation axis in the axial gap, the damper having axially opposite first and second damper surfaces, the first damper surface adjacent to the seat; and
   a split ring disposed about the rotation axis in the axial gap adjacent to the second damper surface, the split ring having an outer ring edge radially outward relative to the rotation axis and spaced radially inwardly from the inner body surface, the split ring radially engaging the lip at the rated axial location and resiliently expandable radially outwardly under centrifugal load relative to the rotation axis such that expanding the split ring radially against the lip axially deflects the split ring toward the seat so as to axially load the damper against the seat;
   wherein the damper has lugs defined axially between the first damper surface and the second damper surface and extending radially from radially inward of the inner lip edge to radially outward of the inner lip edge relative to the rotation axis, and the body defines axial passages defined inward a side of the body to the seat across the lip, the axial passages sized and arranged complementarily to the lugs such that the lugs are slidable across the lip as the damper is slid axially from outward of the side of the body to inside the axial gap.

2. The gas turbine engine rotor of claim 1, wherein the lip has a lip ramping surface extending between an outer lip edge at a first axial location and the inner lip edge at a second axial location of the body relative to the rotation axis, the outer lip edge being radially outward of the inner lip edge, and the rated axial location is between the first axial location and the second axial location.

3. The gas turbine engine rotor of claim 2, wherein the lip ramping surface tapers as it extends from the second axial location to the rated axial location.

4. The gas turbine engine rotor of claim 2, wherein the outer ring edge is located radially outward of the rated axial location upon the split ring radially engaging the lip at the rated axial location.

5. The gas turbine engine rotor of claim 2, wherein the split ring is resiliently compressible radially inwardly such that the outer ring edge fits radially inward of the inner lip edge.

6. The gas turbine engine rotor of claim 1, wherein the split ring has a first ring side adjacent to the second damper surface and a second ring side defining a lateral ring edge radially inward of the outer ring edge, the lateral ring edge adjacent to the lip ramping surface, and the split ring has a ring ramping surface extending between the lateral ring edge and the outer ring edge, the split ring radially engaging the lip ramping surface via the ring ramping surface at the rated axial location.

7. The gas turbine engine rotor of claim 6, wherein the ring ramping surface has one of a curved shape and a conical shape.

8. The gas turbine engine rotor of claim 1, wherein the inner lip edge is located radially inward of the first radial location.

9. The gas turbine engine rotor of claim 1, wherein the inner body surface extends from around the first damper surface to around the second damper surface so as to circumscribe a radial gap surrounding the damper.

10. The gas turbine engine rotor of claim 9, wherein the inner body surface is sized such that the damper is displaceable between a nominal radial position and a rated radial position in the radial gap unhindered by the inner body surface.

11. The gas turbine engine rotor of claim 1, wherein the damper has an outer damper edge located radially outward of the outer ring edge relative to the rotation axis.

12. The gas turbine engine rotor of claim 1, wherein the split ring is in a wedged configuration between the lip at the rated axial location and the second damper surface.

13. A gas turbine engine rotor defining a rotation axis, the rotor comprising:
 a body rotatable about the rotation axis, the body having an inner body surface radially inward relative to the rotation axis, a seat axially inward the body relative to the rotation axis, the seat having an outer seat edge at a first radial location of the body relative to the rotation axis, the outer seat edge surrounded by the inner body surface at a second radial location of the body relative to the rotation axis, the body having a conical ramping surface about the rotation axis tapering radially inwardly from an outer ramp edge of the conical ramping surface to an inner ramp edge of the conical ramping surface located radially inward of the first radial location, the inner ramp edge spaced axially away from the seat so as to define an axial gap between the seat and the conical ramping surface;
 a damper disposed about the rotation axis in the axial gap, the damper having axially opposite first and second damper surfaces, the first damper surface adjacent to the seat; and
 a split ring disposed about the rotation axis in the axial gap adjacent to the second damper surface, the split ring radially engaging the conical ramping surface radially inward of the outer ramp edge, the split ring resiliently expandable radially outwardly under centrifugal load relative to the rotation axis such that radially loading the split ring against the conical ramping surface axially loads the split ring against the damper toward the seat;
 wherein the damper has lugs defined axially between the first damper surface and the second damper surface and extending radially from radially inward of the inner ramp edge to radially outward of the inner ramp edge relative to the rotation axis, and the conical ramping surface is defined by a lip of the body projecting radially inwardly from the inner body surface, the body defining axial passages extending inward a side of the body to the seat across the lip, the axial passages sixed and arranged complementarily to the lugs such that the lugs are slidable across the lip as the damper is slid axially from outward of the side of the body to inside the axial gap.

14. The gas turbine engine rotor of claim 13, wherein the body has a discoid portion defining a bore about the rotation axis and a ridge projecting axially outward from the discoid portion, the ridge having an inner ridge surface radially inward relative to the rotation axis, the seat and the inner body surface defined in the ridge radially outward of the inner ridge surface.

15. The gas turbine engine rotor of claim 14, wherein the seat, the inner ridge surface and the conical ramping surface define a groove extending radially outwardly relative to the rotation axis in the inner ridge surface.

16. The gas turbine engine rotor of claim 13, wherein the split ring has an outer ring edge surrounded by the inner body surface, a first ring edge adjacent to the second damper surface and a second ring edge located radially inward of the outer ring edge, the second ring edge adjacent to the conical ramping surface.

17. The gas turbine engine rotor of claim 16, wherein the split ring radially engages the conical ramping surface radially inward of the outer ring edge, and the conical ramping surface circumscribes a radial gap surrounding the split ring as the conical ramping surface extends from around the second ring edge to the outer ramp edge.

18. A gas turbine engine rotor having a rotation axis, the gas turbine engine rotor comprising:
 a body rotatable about the rotation axis, the body having an inner body surface radially inward relative to the rotation axis, a seat axially inward the body relative to the rotation axis, the seat having an outer seat edge at a first radial location of the body relative to the rotation axis, the outer seat edge surrounded by the inner body surface at a second radial location of the body, the body including a lip extending circumferentially along the inner body surface, the lip having an inner lip edge spaced axially away from the seat so as to define an axial gap between the seat and the lip, the lip at a rated axial location of the body between the inner lip edge and the seat facing toward the seat at a normal angle relative to the rotation axis;
 a damper disposed about the rotation axis in the axial gap, the damper having axially opposite first and second damper surfaces, the first damper surface adjacent to the seat; and
 a split ring disposed about the rotation axis in the axial gap adjacent to the second damper surface, the split ring having an outer ring edge radially outward relative to the rotation axis and spaced radially inwardly from the inner body surface, the split ring radially engaging the lip at the rated axial location and resiliently expandable radially outwardly under centrifugal load relative to the rotation axis such that expanding the split ring radially against the lip axially deflects the split ring toward the seat so as to axially load the damper against the seat;
 wherein the lip is a detachable portion of the body received by the inner body surface and fastenable in position relative to the inner body surface upon the damper being adjacent to the seat, the split ring being adjacent to the damper and the lip being adjacent to the split ring.

19. The gas turbine engine rotor of claim 18, wherein the lip has a lip ramping surface extending between a first axial location and a second axial location of the body relative to the rotation axis, the inner lip edge being at the second axial location, the lip ramping surface having an outer lip edge at the first axial location being radially outward of the inner lip edge, and the rated axial location is between the first axial location and the second axial location.

20. The gas turbine engine rotor of claim 19, wherein the lip ramping surface tapers as it extends from the second axial location to the rated axial location.

* * * * *